3,506,585
METHOD FOR RECLAIMING RARE EARTH
FLUORESCENT SUBSTANCES
Shigeru Otsuka, Kyoto, and Yoichi Okabayashi, Takatsuki-shi, Japan, assignors to Matsushita Electronics Corporation, Kadoma-shi, Osaka, Japan, a corporation of Japan
Filed Dec. 27, 1966, Ser. No. 604,816
Claims priority, application Japan, Dec. 28, 1965, 41/306
Int. Cl. C09k 1/04
U.S. Cl. 252—301.4                     3 Claims

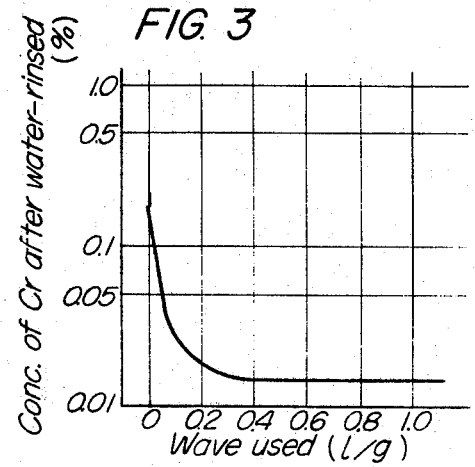
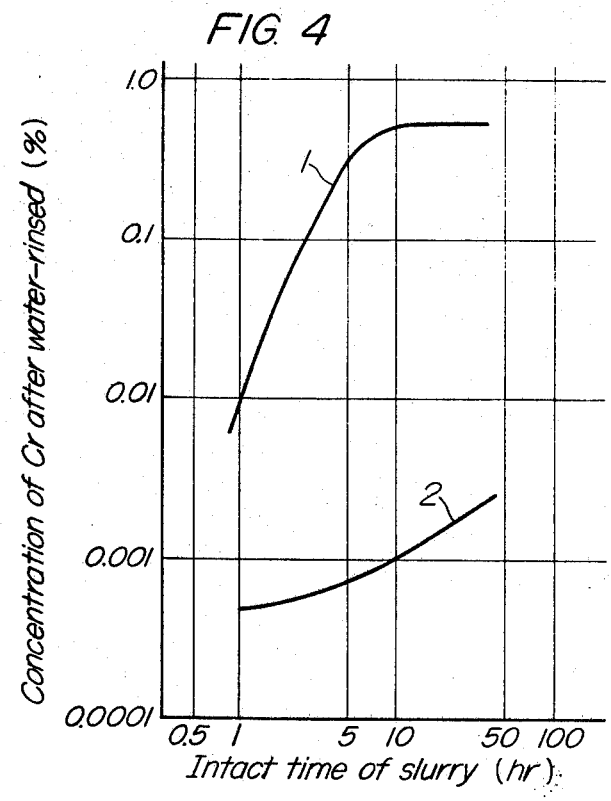

ABSTRACT OF THE DISCLOSURE

A method is disclosed for recovering a rare earth oxide phosphor having a low chromium content comprising a member selected from the group consisting of europium activated yttrium oxide, gadolinium oxide and their solid solution from a slurry for forming a fluorescent screen which contains said phosphor, chromates and an organic binder, the method comprising filtering out solid substances containing said phosphor from said slurry, adding nitric acid to said solid substances to dissolve a main component of said solid substances to form a nitrate solution, adding an oxalic acid solution to said nitrate solution to form a precipitate having a low chromium content, and firing said precipitate at a temperature of 1000°–1400° C.

---

The present invention relates to a method for reclaiming the waste phosphor liquors or slurries from manufacturing color television tubes screens and, more particularly, recovering from such slurries for reuse the fluorescent substances having yttrium oxide, gadolinium oxide, or both, or yttrium vanadate matrices and using rare earth elements, such as europium, as activators.

As is generally known and used in the art of manufacturing color television tube screens, the fluorescent screen is regularly dotted with three kinds of phosphors which produce red, green and blue colors, respectively. For the dots luminous in red color, rare earth fluorescent substances, such as, europium activated yttrium oxide, gadolinium oxide, or yttrium vanadate are preferred.

These dotted fluorescent screens are manufactured by conventional photoprinting processes whereby the light hardening property of a photosensitive resin is utilized. Each phosphor is suspended in an aqueuos solution of polyvinyl alcohol which is photosensitized by adding ammonium dichromate. The slurry prepared in this way is applied over the screen area of the face plate by the known flow coating method, thereafter dried by radiant heat and the screen is exposed through a mask to ultraviolet rays which make the desired dot pattern insoluble, then the remaining part is washed down.

This operation is repeated for each of the green, blue and red color-emitting phosphors for producing the fluorescent screens with three kinds of dots.

However, in carrying out this process, a substantial amount of the original phosphor slurry is lost as excess waste, and with respect to this waste or waste liquor containing the fluorescent substances for the red color, economics dictates reclamation and reuse in view of the high cost of materials. We have discovered that under appropriate circumstances such waste liquors can be reclaimed.

The waste liquors resulting from color fluorescent screen manufacture are basically two. First, the excess amount of slurry applied onto the screen area of the face plate by the flow coating method can be recovered and represents approximately 80–90% of the total reclaimable waste material. Its composition is substantially identical to the slurry applied to the screen area in the first instance, and, as an example, the results (by weight percent) of certain spectographic analyses of the phosphors in excess slurries are given in Table 1 below.

TABLE 1

| Elements analyzed | Cr | V | Si | Al | Cd | Zn | Mg |
|---|---|---|---|---|---|---|---|
| Accumulated excess slurry phosphor (I) | 0.26 | 1 | 0.1 | 0.01 | 0.1 | 0.1 | 0.01 |
| Sample excess slurry, europium activated yttrium oxide phosphor (II) | 0.17 | 0.001 | 0.1 | 0.01 | 0.001 | 0.005 | 0.01 |

Second, during the water rinsing of the screen, the water removes that portion of the fluorescent material which was not sensitized at the time of the exposure development. The contents of the rinse water make up the remainder of the recoverable fluorescent substances and its contaminants are not greatly different from the excess slurry recovered.

As illustrated in Table 1, the inventors have found that when the red-emitting phosphor waste liquor from television tube screen manufacture is reused after mere filtration and drying, a considerable amount of chromium is adsorbed by the phosphor particles. This adsorption of chromium on the red-emitting phosphor particles makes these particles unfit for reuse in the color television tube screen manufacture for at least two important reasons.

First, presence of chromium adsorbed by the phosphor particles in excess of a critical amount substantially depresses the cathode luminescent brightness of the red color dots after baking of the screen due to the so-called killer effect.

Second, when chromium is retained by the red-emitting color phosphor, the body color of the phosphor itself is a deep yellow. Accordingly, during the manufacture of the fluorescent screen at the time of exposure to the ultraviolet ray, the ultraviolet is adsorbed by the body color and fails to fully penetrate all the way to the face plate surface. Consequently, insufficient hardening of the photosensitive resin near the face plate surface results and causes faulty coating which is called "dot fall."

Accordingly, it is the principal object of this invention to reclaim the fluorescent substances from the waste liquors of the red color-emitting phosphor dot formation of color television tube screen manufacture for effective reuse.

In carrying out this primary object it is a necessary object to reclaim the fluorescent substances in such a form that the screens manufactured upon reuse will not be subject to the so-called killer effect or "dot fall" for the red color-emitting phosphor.

A further object is to accomplish the desired reclamation in a convenient and economical fashion.

An additional object resides in the ability to use all available fluorescent substances for the red-emitting phosphor without wasted and thereby reduce the expense of starting materials and of the overall cost for the manufacture of color television tubes.

Other objects will be apparent from the following more detailed explanation of the invention.

It has been found that the waste liquors of the red color-emitting phosphor can be effectively reused without any degradation of color television tube screens manufactured therewith if the chromium content is reduced below a critical maximum percentage of the fluorescent substance. More particularly, it has been found that reclaimed rare earth phosphors containing 0.01% or less chromium can be reused in slurry as the fluorescent substance.

Further, two important techniques have been developed for reclaiming the waste liquor fluorescent substances to the requisite purity depending upon the length of time the waste liquor is permitted to remain untreated.

First, it has been found that if the waste liquors are left intact for not longer than one hour, the chromium content can be easily removed in the form of the dichromic ion (or the chromic ion) if the fluorescent substance after filtration from the waste liquors is washed with a critical volume of water per gram of filtered slurry solids.

If the slurry constituents are permitted to remain intact for a longer period than one hour, the chromium content is not readily susceptible to reduction within an acceptable range by water rinsing. Further, the longer the waste liquor slurry is allowed to remain intact, the greater the amount of chromium adsorbed on the surface of the fluorescent substance. And, once adsorbed, the chromium content is not susceptible to removal by water rinsing. Therefore, as the second technique, it has been found that separation is possible by precipitation and separation of the rare earth fluorescent substance, as its oxalate, under specified conditions.

The above described features of this invention are graphically demonstrated in the accompanying drawings which form a part of this application and disclose the following:

FIG. 3 is a graph plotting the concentration of chromium remaining after water rinsing against the quantity of water used for rinsing when the waste liquor slurry has remained in contact for one hour; and FIG. 4 is a graph showing the amount of chromium remaining after water rinsing as a result of the time elapsed during which the europium activated yttrium oxide is permitted to remain intact in the slurry.

Figure 1:
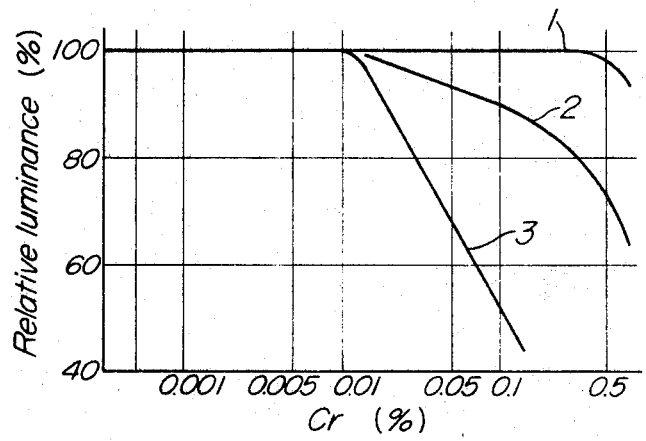
FIG. 1 is a graph showing the relationship between the chromium content of europium activated yttrium oxide phosphor and its brightness under cathode ray excitation.

As explained previously, the adsorption of the chromium content in waste liquors from the formation of the red-emitting phosphor dots on color cathode ray tube screens prevented the reuse of the excess or waste fluorescent substances after filtration and drying due to the so-called killer effect. This effect is clearly demonstrated in FIG. 1. Curve 1 presents the brightness of filtered and dried europium activated yttrium oxide phosphors containing chromium contamination before heat treatment, and curves 2 and 3 represent the phosphor relative luminescence (brightness) after heat treatment at 450° C. for three hours and at 1200° C. for five hours, respectively. From this graph, it is overwhelmingly apparent that the relative luminescence of the red-emitting phosphor is unaffected by a chromium content of about 0.01% or less, even under extreme baking conditions.

Figure 2:
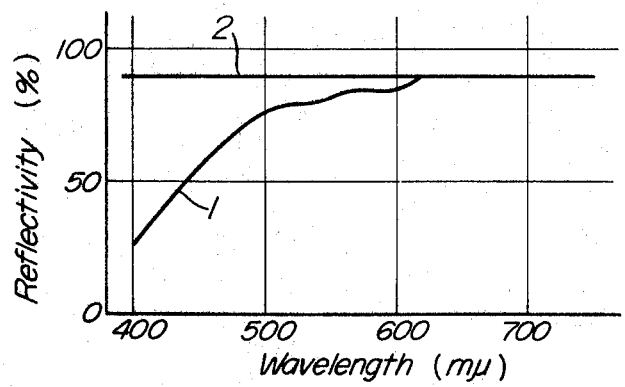
FIG. 2 is a graph showing the spectral reflectance curves of a europium activated yttrium phosphor sample reclaimed in accordance with this invention (curve 2) and the phosphor under contaminated conditions before being reclaimed (curve 1)

FIG. 2 emphasizes the susceptibility of waste liquor red-emitting phosphors upon reuse to form faulty coatings subject to "dot fall," and the ability of the same phosphor when reclaimed in accordance with the instant invention to overcome this defect of manufacture. Curve 1 plots the spectral reflectances measured with a photoelectric spectral photometer of the europium activated yttrium oxide phosphor (II) of Table 1 obtained by a mere filtration and drying of the waste excess slurry. Curve 2 is a similar graph of the same phosphor reclaimed in accordance with this invention. As demonstrated by comparison of curves 1 and 2, the phosphor obtained from the excess slurry after filtration and drying will absorb the ultraviolet rays and cause an insufficient hardening of the screen. On the other hand, removal of the chromium content in accordance with this invention eliminates the ultraviolet ray adsorption thereby removing the cause of "dot fall."

The two procedures which have been discovered for reclaiming to a high degree of purity the red-emitting fluorescent substance from the waste liquors of color television tube screen manufacture eliminate the depression of brightness due to contamination and overcome "dot fall" due to the insufficient hardness of the photosensitive resin on the screen surface.

Since the main components of the waste liquors are ammonium dichromate (or ammonium chromate), polyvinyl alcohol, and the fluorescent material, the chromium content has been found to be easily reduced by removal in the form of the dichromic ion (or the chromic ion). FIG. 3 represents the relationship between the amount of water used for the water rinsing and the percentage chromium contamination of the phosphor if the excess slurry of the europium activated yttrium oxide phosphor (II) of Table 1 is allowed to remain in contact for one hour before filtration.

From FIG. 3 it can be seen that when the filtered fluorescent substance is treated with an amount of water in excess of 100 ml./g. of filtrate, the amount of chromium residue is in the order of 0.01-0.02%. This amount of chromium contamination does not depress the brightness appreciably, and the slurry of such fluorescent substance was found to produce a highly satisfactory red color-emitting phosphor (see FIG. 1).

Referring now to FIG. 4, it can be seen by curve 1 that the concentration of chromium contaminant adsorbed by the phosphor particles and therefore not removable from the phosphor particles by water rinsing increases steadily with increase in the time period over which the excess slurry is permitted to remain intact. After longer periods of time, the amount of chromium adsorbed on the surface of the fluorescent substance reaches an equilibrium condition.

While the theory of the adsorption is not as yet fully understood, it is believed that the dichromic ion is disassociated and the concentration of the hydrogen ion is altered. In any event, it has been found that the separation of the important fluorescent substance can be achieved by precipitation of its oxalate even though substantial chromium adsorption has taken place, such as when the slurry or waste liquors are left intact for more than one hour.

In accordance with the invention, the waste liquor from the dot forming and rinsing procedures are first filtered or the solid contents separated by using a centrifugal separator. The filtrate or solid materials are then treated with nitric acid to separate and remove acid insoluble matters, such as for example, the chromium oxide which coats the fluorescent material and the like. The nitric acid solution is then diluted with water in the proportion of 2000–5000 ml./100 g. of the fluorescent substance. The higher side of this range is preferred for the dilution inasmuch as the greater the dilution, the higher the purity of the reclaimed fluorescent substance.

The diluted solution is then heated to 80°–100° C. and 10–20% oxalic acid previously raised to the same temperature as the solution (between 80°–100° C.) is added in an amount approximately 1.5–2 times the theoretical amount for precipitating the dissolved rare earth elements as oxalates. Upon addition of the oxalate, the rare earth elements, such as yttrium, gadolinium, and the europium are separated in the form of oxalate precipitates of very high purity.

The designated 80°–100° C. range is very important in order to achieve the very high purity precipitates possible by this procedure. If the temperature is below the specified range, the precipitation takes place too rapidly thus causing coagulation of the resultant precipitate and possible impurity. Should the precipitation be carried out at room temperature, it is necessary to retard the reaction velocity by diluting the nitric acid solution and the oxalic acid solution. However, in view of the excessive dilution necessary to carry out a proper precipitation below the specified 80°–100° C. range, utilizing a lower temperature lacks economy and, therefore, is commercially impractical.

After drying the oxalic precipitate at 105°–130° C., conversion into the rare earth oxides can be accomplished by heat decomposition under a temperature of about 800° C. for two to three hours.

The effectiveness of the oxalate precipitation technique is evidenced by curve 2 of FIG. 4. The chromium concentration after oxalate precipitation in accordance with the above described technique can be compared with the concentration before such treatment (but after water rinsing) (curve 1) for any specific period of time for which the fluorescent substance slurry is left intact. As shown, even in the case where the fluorescent substance from the waste liquors is covered with relatively stable material and the liquor has been left intact for as long as 20–30 hours, the amount of chromium residue can be reduced below 0.0005% by the oxalate precipitation technique.

Therefore, regardless of which technique, water rinsing or oxalate precipitation is used to reduce the chromium content of the reclaimed fluorescent substance in accordance with this invention, the recovered red color-emitting phosphor is reusable in screen manufacturing.

In order to emphasize the effect of this invention, Table 2 below represents the results of the spectographic analyses of europium activated yttrium oxide phosphor (II) of Table 1 after reclamation by precipitating the oxalates in accordance with this invention. Table 2 also sets forth the comparative results previously presented in Table 1.

EXAMPLE 1

A slurry of europium activated yttrium oxide phosphor remaining as the excess slurry from the flow coating method treatment of a color television tube screen for making the desired red-emitting phosphor dot pattern and having as components, the fluorescent substance, polyvinyl alcohol, ammonium dichromate, ammonium chromate, and water, and the spectrograph analysis shown for the phosphor (I) of Table 1, was left intact for one hour. The contaminated phosphor solids were separated from the carrier solution by a centrifugal separator. Thereafter, the fluorescent material was shaken with 30 ml. of water per gram fluorescent material, and the latter was again separated by the use of a centrifugal separator. This operation was repeated four times, and the reclaimed material was dried at 105°–150° C. for two to five hours. The chromium content in the phosphors thus obtained was less than 0.01% and no other impurities were shown. When the phosphor as reclaimed was used again for manufacturing color television tube screens, no abnormalities were observed in the cathode luminescent brightness or the luminous characteristics of the red-emitting phosphors of the screen.

EXAMPLE 2

The slurry of Example 1 was left intact for over one hour. The contaminated phosphor was separated by a centrifugal separator from the carrying liquid. The phosphor was then decomposed with nitric acid and the acid insoluble material were separated and removed. Water was added to the acid solution in the proportion of 2000–5000 ml./100 g. of the fluorescent substance and the resultant solution heated to 80°–100° C. A solution of 10–20% oxalic acid previously heated to the same temperature within the range of 80°–100° C. A solution of diluted solution in 1.5–2 times the theoretical amount to precipitate the rare earth oxalates. The precipitate thus obtained was separated, cleaned, dried, and then decomposed by heat at 800° C. for two to three hours during which time the oxalates were converted into oxides.

Thereafter, when this precipitate was made into the desired fluorescent substance, the chromium content was found to be below 0.0005% and other impurities were totally absent. The extent of the reclamation of the rare

TABLE 2

| Elements analyzed | Cr | V | Si | Al | Cd | Zn | Mg |
|---|---|---|---|---|---|---|---|
| Accumulated excess slurry phosphor (I) | 0.26 | 1 | 0.1 | 0.01 | 0.1 | 0.1 | 0.01 |
| Sample excess slurry europium activated yttrium oxide phosphor (II) | 0.17 | 0.001 | 0.1 | 0.01 | 0.001 | 0.005 | 0.01 |
| Sample (II) above reclaimed in accordance with this invention (oxalate precipitation) | 0.0005 | 0 | 0.0005 | 0.0001 | 0 | 0 | 0.00001 |

The europium content in the sample under consideration was measured before and after reclamation by the method of D.C. polarographic analysis. No difference was recognized. Moreover, the body colors themselves corresponded with FIG. 2, and the relationship between the chromium concentration and the cathode luminescence brightness corresponded to that shown in FIG. 1.

Furthermore, even where other fluorescent substances, such as for example zinc sulfide and zinc cadmium sulfide phosphor, are mixed with the rare earth fluorescent substances in the treatment of the television tube screen and, therefore, are combined in the excess slurry and water rinse waste liquors, the rare earth fluorescent material can be reclaimed to a high purity by the technique of separating through precipitation of its oxalates in accordance with this invention.

The present invention having been described in general terms, several examples are hereafter presented which are intended to further amplify and teach specific embodiments of the instant invention.

earth materials was found to be over 99% of the theoretical amount. The reclaimed phosphor was reused for tube screen manufacture and the cathode luminescent brightness and the luminous characteristics found totally satisfactory.

EXAMPLE 3

When the technique of separation by precipitation of the oxalate similar to that described in Example 2 was applied to a mixture of the fluorescent substance described in Example 1 together with zinc sulfide and zinc cadmium sulfide phosphor, a rare earth fluorescent substance of high purity was reclaimed. This fluorescent substance was found to be no different from that obtained in Example 2 insofar as its characteristics, such as purity of the particles and the content of the activator, and its reuse produced satisfactory results.

The foregoing is considered explanatory of the invention. Since numerous modifications might be made to the compositions and methods described herein without

What is claimed is:

1. A method for recovering a rare earth oxide phosphor having a low chrominum content comprising a rare earth oxide selected from the group consisting of europium activated yttrium oxide, gadolinium oxide and solid solutions thereof from a slurry for forming a fluorescent screen which contains said phosphor, chromates and an organic binder, which comprises the steps of filtering out solid substances containing said phosphor from said slurry, adding nitric acid to said solid substances to dissolve said rare earth oxide present in said solid substances to form a rare earth nitrate solution, adding an oxalic acid solution to said rear earth nitrate solution to form a rare earth oxalate precipitate having a low chromium content, and firing said rare earth oxalate precipitate at a temperature of 1000°–1400° C.

2. A method according to claim 1, wherein said rare earth nitrate solution is maintained at a temperature of 80°–100° C.

3. A method according to claim 1, wherein the amount of oxalic acid added to the rare earth nitrate solution is 1.5–2.0 times the stoichiometric amount with respect to the rare earth content of said solution.

References Cited

UNITED STATES PATENTS

| | | | |
|---|---|---|---|
| 3,291,747 | 12/1966 | Lefever | 252—301.4 X |
| 3,322,682 | 5/1967 | Thompson | 252—301.4 |
| 3,357,925 | 12/1967 | Levine | 252—301.4 |
| 3,449,258 | 6/1969 | Ropp | 252—301.4 |
| 3,449,259 | 6/1969 | Ropp | 252—301.4 |
| 3,457,184 | 7/1969 | Kobayashi | 252—301.4 |
| 2,722,471 | 11/1955 | Hirsch | 23—19 |
| 2,943,101 | 6/1960 | Peters | 23—19 X |
| 2,967,088 | 1/1961 | Peters | 23—312 X |
| 3,009,767 | 11/1961 | Kohman | 23—19 X |
| 3,348,924 | 10/1967 | Levine | 23—312 |

FOREIGN PATENTS 866,715  4/1961  Great Britain.

OTHER REFERENCES

Ropp, Journal of Electrochemical Society, vol. 111, No. 3, pp. 311–317, March 1964.

Ruprych, Chemical Abstracts, vol. 52, 1958.

WILBUR L. BASCOMB, JR., Primary Examiner

S. J. EMERY, Assistant Examiner

U.S. Cl. X.R.

23—19, 23, 183, 300, 305, 312; 117—33.5